Nov. 8, 1955

C. M. MOORE 2,722,725

JOINT CLAMPING MEANS

Filed May 31, 1951

INVENTOR
Clyde Maurice Moore

BY
Bacon & Thomas
ATTORNEYS

Nov. 8, 1955

C. M. MOORE 2,722,725

JOINT CLAMPING MEANS

Filed May 31, 1951

INVENTOR
*Clyde Maurice Moore*

BY *Bacon & Thomas*

ATTORNEYS

Nov. 8, 1955 — C. M. MOORE — 2,722,725
JOINT CLAMPING MEANS
Filed May 31, 1951 — 4 Sheets-Sheet 3
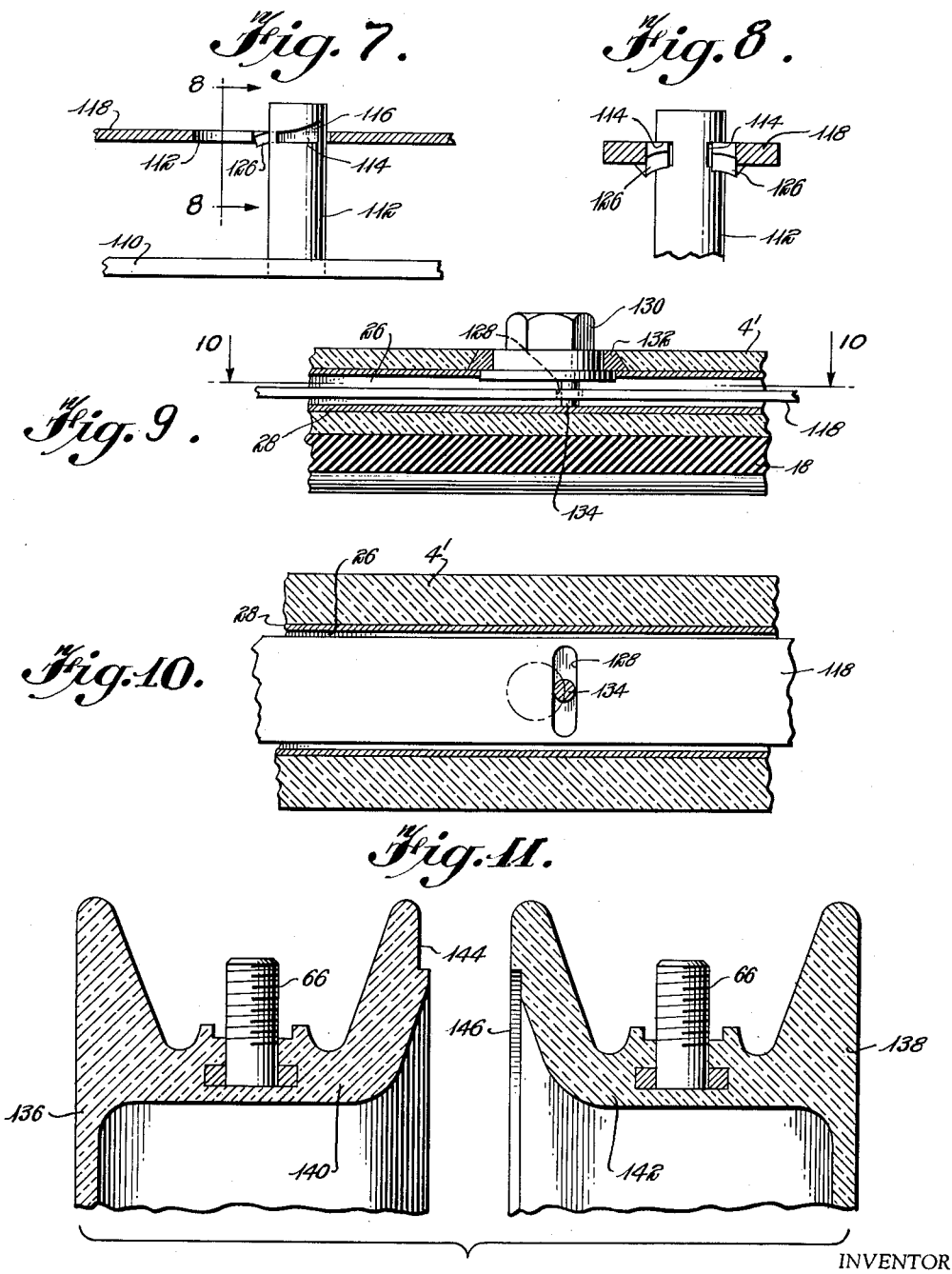
INVENTOR
Clyde Maurice Moore
BY Bacon & Thomas
ATTORNEYS Nov. 8, 1955   C. M. MOORE   2,722,725
JOINT CLAMPING MEANS
Filed May 31, 1951   4 Sheets-Sheet 4
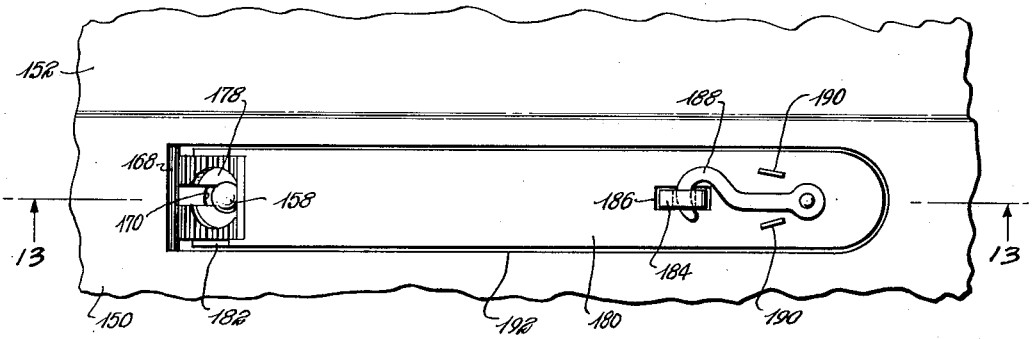
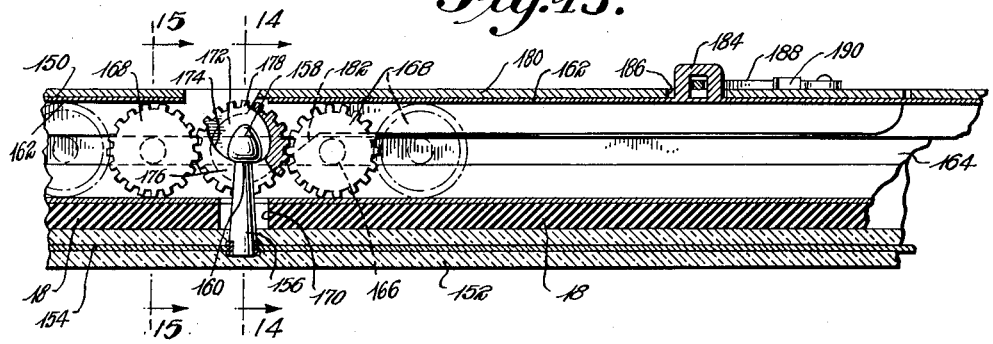
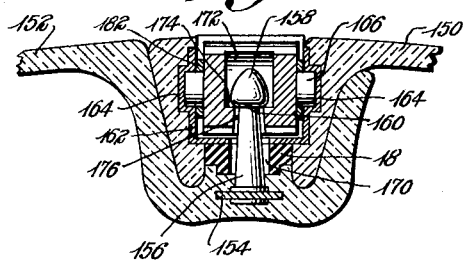 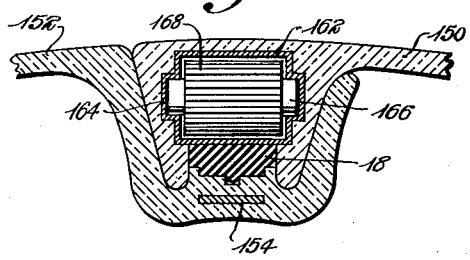
INVENTOR
*Clyde Maurice Moore*
BY *Bacon & Thomas*
ATTORNEYS

United States Patent Office 2,722,725
Patented Nov. 8, 1955

2,722,725
JOINT CLAMPING MEANS

Clyde Maurice Moore, Richmond, Va., assignor to Moorex Industries, Inc., Richmond, Va., a corporation of Virginia Application May 31, 1951, Serial No. 229,173

10 Claims. (Cl. 20—92)

This invention relates to joint clamping means and particularly to means for clamping overlapping edge portions of panels together.

The invention disclosed herein is an improvement in the clamping means disclosed in copending applications of this same applicant as follows: Serial No. 167,793, filed June 13, 1950, now Patent No. 2,673,659, dated March 30, 1954; Serial No. 177,106, filed August 1, 1950; Serial No. 209,169, filed February 2, 1951.

The disclosures of the above-noted copending applications relate to joints between panels comprising sealed structures such as containers or the like and they disclose spaced clamping means along each of the joints between adjacent panels. According to those earlier disclosures each clamping means must be individually tightened in assembling the structures disclosed.

The present invention relates to means for simultaneously tightening the clamping means extending along a substantial portion or all of a joint between adjacent panels, the joint structure itself being substantially as disclosed in those earlier applications.

According to the present invention adjacent panels comprising a structure such as a demountable container, boat, tank, swimming pool, building or the like, are provided with overlapping edge portions having interfitting rib-and-channel shapes with clamping means to hold the interfitting parts in tight engagement. The joints may be provided with flowable sealing means or may be assembled without such sealing means where a complete seal is not necessary. In general the present invention is applicable to any of the joint structures disclosed in those earlier applications and comprises means for simultaneously tightening a plurality of clamping means spaced along the joints.

In many applications it is advantageous to fabricate the various panels to the desired shape and ship them to the point of use prior to assembly into a finished structure. The panels may take shapes necessary to define whatever structure it is desired to assemble and may be shipping drums for liquids, chemicals or other materials or may be in the form of fire bombs, auxiliary fuel tanks for aircraft, or the like. Particularly in the latter mentioned structures time of assembly is an important factor and uniformity of pressure along the joint is also necessary.

By the present invention applicant provides means for quickly assembling panels into such structures wherein an entire joint between panels can be clamped by manipulating a single actuator element. In general the mating edge portions of the panels are each provided with a separable portion of the clamping means and the other panel edge is provided with movable means engageable with the clamping means on the first panel to apply the necessary clamping pressure to the joint. All of the movable means on the one panel are interconnected for simultaneous movement and a limited number of movable actuators are arranged to impart movement to a plurality of the clamping elements at the same time, thus providing an arrangement for quickly assembling the desired structure and wherein, after use, the structure may be disassembled and the parts stacked or nested in compact relation for efficient storage or shipping.

It is therefore an object of this invention to provide clamping means for a joint capable of extremely rapid assembly.

Another object of this invention is to provide clamping means for a joint wherein no separable elements are employed, thus obviating the possibility of essential parts becoming lost.

Still another object of this invention is to provide clamping means for an elongated joint, which clamping means are completely enclosed by the structure assembled and thus not exposed to the materials being handled or to the deleterious effects of weather.

A still further object of this invention is to provide a joint for a demountable structure wherein assembly may be accomplished in a minimum length of time and by the use of a minimum number of tools.

Still another object of this invention is to provide spaced clamping means for an elongated joint and means to set those clamping means uniformly throughout the length of the joint.

Additional objects and advantages will become apparent to those skilled in the art as the description proceeds in connection with the accompanying drawings, wherein.

Figure 2:
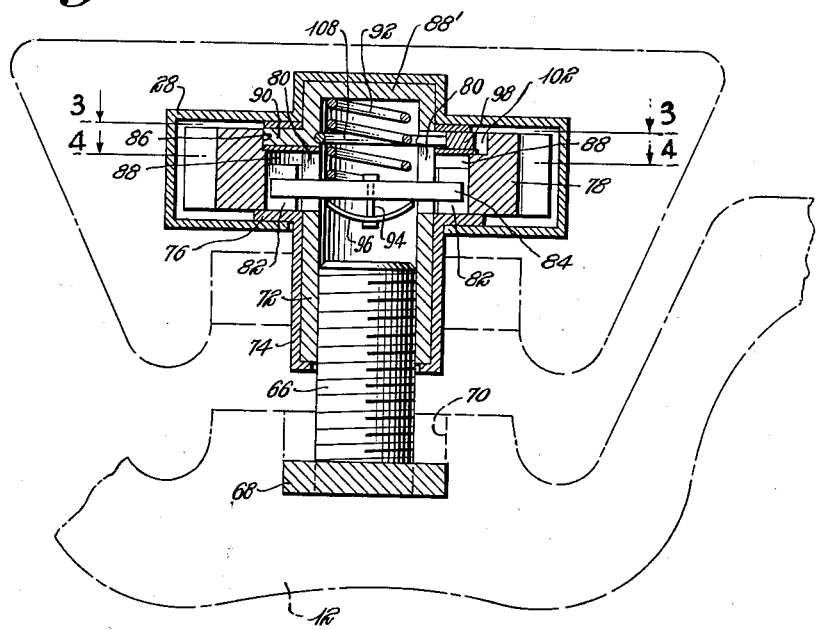
Figure 2 is a sectional view through a joint illustrating a still further modified form of clamping means, the panel edges being shown in dotted line.
Figure 3:
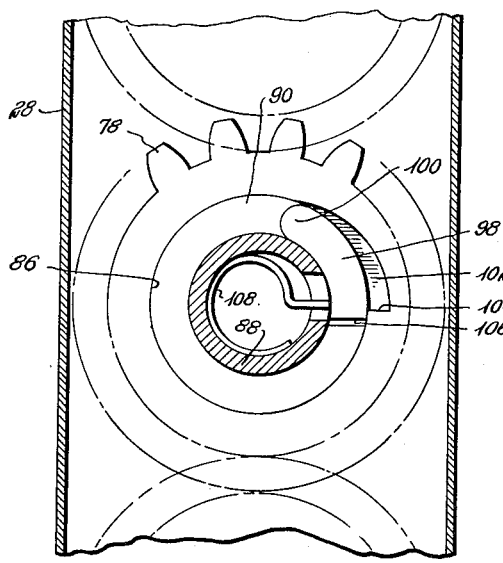
Figure 4:
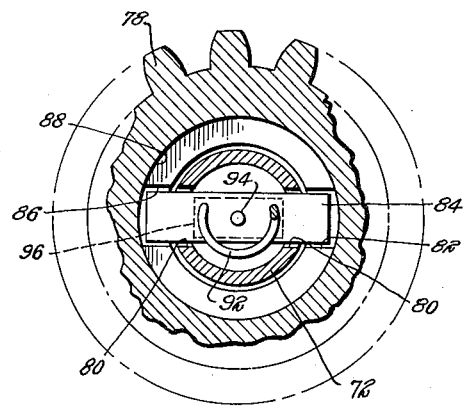

Figures 3 and 4 are sectional views taken, respectively, along the lines 3—3 and 4—4 of Fig. 2.

Figure 5:
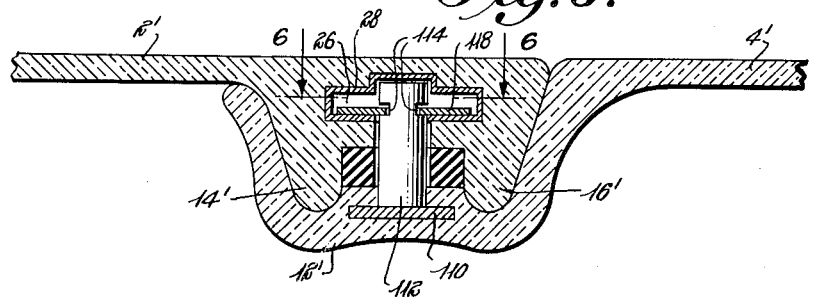

Figure 5 illustrates a still different embodiment of the present invention and is a sectional view through one of the clamping means of this embodiment.

Figure 6:
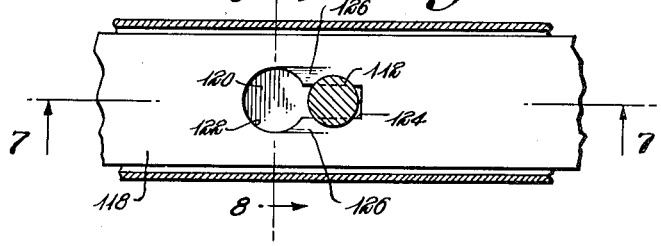

Figure 6 is a fragmentary sectional view taken on the line 6—6 of Fig. 5.

Figure 7 is a sectional view taken substantially along the line 7—7 of Fig. 6.

Figure 8 is a fragmentary sectional view taken on the line 8—8 of Figs. 6 and 7.

Figure 9 is a longitudinal sectional view through the joint of Fig. 5 showing an actuator for effecting clamping of the joint.

Figure 10 is a sectional view taken substantially along the line 10—10 of Fig. 9.

Figure 11 is a sectional view through the edge portions of end panels for a structure incorporating the present invention.

Figure 12 is a plan view of a joint and actuator for a still further modification of joint clamping means.

Figure 13 is a longitudinal sectional view taken substantially along the line 13—13 of Fig. 12.

Figures 14 and 15 are transverse sectional views taken on lines 14—14 and 15—15 of Fig. 13.

Figure 16 is a front elevational view of a cam gear element and actuator lever of this embodiment.

While this description is in connection with a plurality of flat panels, it is to be understood that panels of any desired shape may be joined by the clamping means herein disclosed. For instance, the panels may be cylindrical segments and one panel may be an end wall extending at right angles to the other panels and with its channel structure extending perpendicular to the general plane of the end wall. Similarly, some of the panels may be in the form of conical segments or they may be portions of spheres. Likewise a panel may be a circular manhole cover or access opening cover in any structure.

While the disclosure herein is confined to structures wherein the overlapping elements defining the joint are formed integrally with adjacent panels, such disclosure is for purposes of illustration only and it is within the scope of the present invention to include the simultaneously actuatable clamping means in joints employing separate clamping and sealing bars, as disclosed in the earlier applications of those theretofore identified.

Figure 1:
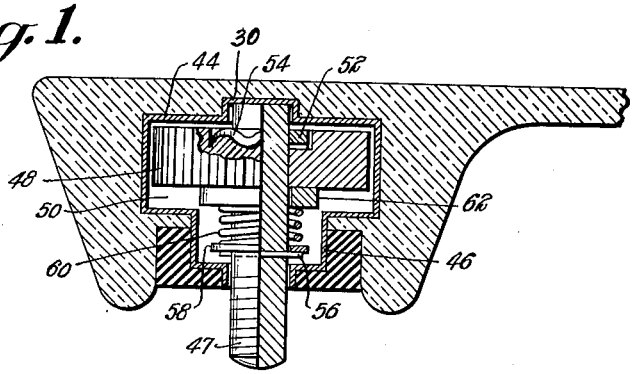
Figure 1 is a sectional view, on an enlarged scale, showing only one of the panel edges and illustrating a form of construction.

Fig. 1 illustrates a structure embodying the present invention.

According to this construction the tubular structure 44 is provided with depending housing portions 46 at the locations of spaced clamping studs 47 which are spaced along the joint, although the housings 46 may extend the entire length of the joint since such construction would be easier to produce. The stud driving gear 48 is of less axial thickness than the corresponding dimension of chamber 50 and is provided with a circular central opening rotatably receiving the shank portion of stud 47. The stud 47 is provided with a washer or collar 52 which may be fixed thereon in any suitable manner and which may have a wavy or undulating surface as shown at 54. The gear 48 is provided with an annular recess surrounding the shank portion of the stud and of such size and shape as to receive the shoulder or collar 52 and with a bottom surface complementary to the undulated portions 54 of the collar. Within the housing 46 the shank of stud 47 is provided with a through pin 56 bearing against a washer 58 which provides reaction for a compression spring 60. The spring 60 may bear against a washer 62 surrounding the stud 47 and bearing on the bottom surface of gear 48. Each of the studs in a joint of this embodiment is connected to its associated gear in the manner shown in Fig. 1. A train of gears extends between adjacent studs 47 in chamber 50 and the driving gears 48 are of an axial thickness substantially equal to the height of chamber 50. In this form of joint clamping means, one of the gears between adjacent clamping studs is provided with an exteriorly accessible actuator which may be a head on one stud projecting outwardly of the panel. By rotation of the actuator the entire train of gears will be rotated, including the driving gears 48. The springs 60 hold the gears 48 in their uppermost position and frictionally seated against the collars 52 whereby to provide a frictional drive connection between the gears 48 and the studs 47. If any one stud is drawn completely tight before the others, the frictional drive thereto may slip while the gear train continues to rotate to tighten the remaining studs of the joint. In many applications the collar 52 may be provided with only a flat bottom surface providing a sufficient frictional drive for the purpose. In such cases the gear 48 may be of an axial thickness substantially equal to the width of chamber 50. In the form shown, however, slippage between the gear 48 and the stud 47 results in axial movement of the gear downwardly in the tubular structure 44. The gear 48 is permitted to move downwardly to disengage itself from the collar 52 while still staying in mesh with adjacent gears of the driving train.

In the modification described this far the gears of the trains, between gears 48, are provided with axial trunnions extending into the grooves 30 of tubular structures 44 and function to maintain the gears in a central and aligned position. The grooves 30 actually constitute bearings for the gear trunnions. In Fig. 1 the stud 47 extends completely through the gear 48 and its upper end functions as a trunnion or axle for the gear.

Referring now to Figs. 2, 3 and 4, these figures show the clamping means of a modified form to be employed with a joint substantially as already described. In this modification the tubular housing structure 28 houses a train of gears as in the previous form. Instead of providing threaded openings or imbedded nuts in the channel portion 12 of one of the panels, this modification employs threaded studs 66 fixedly mounted in the base of the channel and projecting upwardly. Each of the studs 66 is fixed to a longitudinally extending strip of metal 68 imbedded in the material of the channel structure, thus firmly anchoring the studs to their supporting panel and accurately spacing them along the joint. An opening 70 surrounds each stud and extends downwardly to the strip 68.

A rotatable internally threaded tubular nut element 72 is journalled in a sleeve 74 carried by the tubular structure 28 at spaced positions corresponding to the spaced studs 66. The sleeve elements 74 are provided with upper flange portions 76 constituting thrust bearing surfaces for driving gears 78. It is to be understood that the driving gears 78 of this modification are in mesh with gears like those of Fig. 5. The tubular nut 72 extends into a cylindrical bore centrally located in the driving gear 78 and is provided with axially extending radial slots 80. The driving gear 78 is provided with radial slots 82 extending outwardly from its central bore in alignment with and of the same transverse dimensions as the slots 80 in the tubular nut 72. As shown in the drawings the slots 80 extend from a level above the tops of slots 82 downwardly to a position substantially in the plane of the lower surface of gear 78. A rectangular bar or key 84 extends diametrically across the tubular nut 72, through the slots 80 therein and into the slots 82 of the driving gear, thus providing a positive drive between the gear 78 and tubular nut 72. As shown in Fig. 4 the key or bar 84 is of a transverse dimension slightly less than the width of the slots 80 and 82.

The gear 78 is provided in its upper surface with a circular counterbore 86 and a somewhat smaller circular counterbore 88 extending downwardly below the upper end of the slots 80 in tubular nut 72 and extending radially outwardly to the outer extremities of the slots 82. A cap member 88', fixed to the tubular nut 72, is positioned within the tubular structure 28 and has a cylindrical portion defining a trunnion for the driving gear 78 and an outwardly extending flange 90 rotatably received within the counterbore 86 of gear 78. Compression spring 92 is positioned within the cap 88' and bears against the inner surface thereof at its upper end and bears at its lower end against the key or bar 84. The compression spring 92 constantly acts on the key 84 to urge the same downwardly and maintain a driving connection between gear 78 and nut 72. A pin 94 extends loosely through the key 84 and is provided with a head at each of its ends. Between the lowermost head of the pin 94 and the key 84 a bowed leaf spring 96 is positioned with the pin 94 passing loosely therethrough.

If the gear 78 is driven in a direction to advance the tubular nut 72 downwardly on stud 66, a position will be reached where the lowermost end of pin 94 engages the top of stud 66 and continued movement will apply upward pressure to the pin 94 and spring 96 tending to flatten the latter and apply an upward force to the key 84. During this time a substantial torque is being transmitted through the key and the frictional engagement between the key, the nut 72 and gear 78 will be sufficient to prevent upward movement of the key in the slots. A point will be reached, however, when the force exerted by bowed spring 96 is sufficient to move the key 84 upwardly and continued advance of the nut 72 on stud 76 will cause key 84 to move upwardly until its ends pass out of the slots 82 in gear 78 and into the counterbore 88 in gear 78. At this time the spring 96, being stressed, maintains the key 84 in the upper portion of counterbore 88 and overcomes any tendency of the key to reengage the slots 82 under the influence of spring 92. When the ends of key 84 pass into the counterbore 88 the driving connection between the gear and nut is lost and the gear can rotate freely about the nut 72 with the ends of key 84 projecting into the circular counterbore 88. By this construction joint clamping means comprising a plurality of the elements shown in Fig. 2 can be set and even though one of the clamping bars reaches fully engaged position before the others, the gears may continue to rotate until all clamping means are properly set.

The cap member 88' is provided with a pawl 98 (see Fig. 3) positioned in a cut-away portion of the flange 90 and so contoured as to be capable of swinging movement about its curved end 100 in a radial direction. The gear 78 is provided with a ratchet type recess 102 outwardly of the flange 90 and of such shape as to receive the pawl 98. An end surface 104 of the notch 102 is adapted to abut the end surface 106 of pawl 98 and to establish a drive between the gear 78 and the cap 88' in one direction, counterclockwise as seen in Fig. 3. The cap 88' is fixed rigidly to the nut 72 and may be formed integrally therewith and the pawl therefore establishes a drive in one direction between the gear 78 and the nut 72. A spring 108, arranged within the cap 88', acts to urge the free end of pawl 98 outwardly. The ratchet mechanism of Fig. 3 does not establish the drive in a direction to tighten the clamping means since that drive is effected through the key 84. However, the key 84, once disengaged from slots 82, is not capable of reestablishing a drive to the nut to release the clamping means when it is desired to disassemble the structure. At such times, reverse rotation of the gear 78 will be effected through the ratchet mechanism of Fig. 3 to back the nut 72 off stud 66 and release the clamping means. Any suitable actuator accessible from the exterior of the structure may be employed to drive the train of gears of this modification.

Figs. 5 and 10 show a still further modified form of clamping forms. In this modification (Fig. 5) panel 2' is provided with a channel structure 12' integral therewith and panel 4' is provided with ribs 14' and 16' nesting in the channel 12' as previously described. A tubular metallic structure 28 may be imbedded in the panel 4', as described in connection with previous embodiments. A longitudinally extending strip or ribbon of metal 110 is imbedded in the material of channel 12' and has spaced studs 112 fixed thereto and projecting into the chamber 26 defined by the tubular structure 28. The studs 112 are provided with opposed slots or grooves 114 adjacent their upper ends with the grooves extending in a direction parallel to the length of the joint. As shown in Fig. 17 the grooves 114 may be provided with upper cam surfaces 116. Within the tubular structure 28 is a strip of metal or other fairly rigid material 118 extending the full length of the joint. The strip 118 is provided with spaced "key hole" openings 120 corresponding to the positions of the studs 112. Each of the openings 120 comprises a circular enlarged portion 122 and a narrow slot portion 124. The width of the slot 124 is only slightly greater than the distance between the bottoms of grooves 114 while the diameter of the enlarged openings 122 is somewhat greater than the diameter of the studs 112. The strip 118 is longitudinally movable in the tubular structure 28 whereby the enlargements 122 may be aligned with the studs and the edge portions of panels 2' and 4' then moved into the nested relationship shown in Fig. 5 by projecting studs 112 through enlargements 122. After the panels have been thus moved into position the strip 118 may be moved to the position shown in Fig. 6 and the slots 124 thereby caused to embrace the studs 112. During movement of the strip 118 to the position of Fig. 6 the leading edges of the slots 124 may engage the cam surfaces 116 of slots 114 and thereby draw the edge portions of the panels into tight sealing engagement with each other. If desired the edges of the enlarged openings 122 immediately adjacent the slots 124 may be bent downwardly, as at 126 (see Figs. 7 and 8) to provide additional cam surfaces engageable with the surfaces 116 to further facilitate effective clamping of the joint.

At any suitable position along the length of the joint the bar 118 may be provided with a transverse slot 128 (see Fig. 10). A suitable actuator which may comprise a hexagonal head portion 130 (Fig. 9) is suitably journalled in a bearing 132 imbedded in the material of the panel 4'. The actuator extends into the chamber 26 and is provided with an eccentric or crank pin 134 engageable in the slot 128 in member 118. The eccentricity of the pin 134 is such that its total transverse travel during a complete revolution of the actuator 130 is substantially equal to the length of slot 128 and that distance is substantially equal to the distance necessary to move strip 118 from the position shown in Fig. 6 to a position where the stud 112 is entirely within the enlarged opening 122. It will be readily evident that manipulation of the actuator 130, by simple rotation thereof, will cause clamping of the entire joint or release thereof. Clearly the actuator 130 may take other forms. For instance, it may be flush with the outer surface of the panel 4' and provided with a non-circular opening to receive a complementary wrench or the like.

Fig. 11 is merely illustrative of a mode of constructing end panels of a closed structure to facilitate their storage or shipment. The end panels 136 and 138 may be "heads" of a cylindrical drum or similar structure. The panels 136 and 138 have channel structures 140 and 142 formed integrally therewith and constituting parts of the joint previously described. A structure including the panels 136 and 138 may be provided with the threaded clamping studs 66 or any of the other forms of clamping means disclosed herein. The free edge portion of the channel 140 is rabbeted, as at 144, while the free edge of the channel 142 is provided with a rectangular rib 146. Upon disassembly of a structure employing the elements of this figure or prior to initial assembly thereof the panels 136 and 138 may be "stacked" with ribs 146 nested within the rabbets 144. By this feature the pairs of panels are maintained against inadvertent displacement and provide mutual support and reinforcement for the laterally extending channels thereon during shipment or storage.

Figs. 12 to 16 illustrate clamping means for a joint of the general type heretofore disclosed but in which no tools or wrenches are necessary in clamping the panels of the structure together. Panels 150 and 152 are provided with the rib-and-channel structures of previous figures and may be provided with flowable sealing means 18 as also heretofore described. The channel carried by panel 152 has imbedded therein a longitudinally extending metal strip or ribbon 154 and headed studs 156 are spaced therealong and fixed thereto. The studs 156 are provided with shanks of reduced diameter and enlarged heads 158 having lower cam-engaging surfaces 160. The strips 154 not only provide longitudinal reinforcement for the joint but act to accurately space the studs 156 the desired distance apart.

The edge portion of panel 150, outwardly of the ribs, has imbedded therein a longitudinally extending tubular housing 162 provided with opposed grooves 164 in its lateral surfaces. The grooves 164 serve to receive trunnions 166 of gears 168 positioned in the housing 162 for rotation on axes generally parallel to the outer surface of the panels and transverse to the axes of the studs 156. At spaced positions along the housing 162, and at positions corresponding to the location of the studs 156 the housing 162 is provided with openings 170 through which studs 156 project. Those gears located directly inwardly of the openings 170 are provided with internal chambers 172 defined in part by radially inwardly facing cam surfaces 174. A radially extending groove or slot 176 also extends from the outer periphery of those gears inwardly into communication with the chambers 172 and extends a substantial distance around the periphery of the gears. The width of the slots 176 is only slightly greater than the diameter of the shanks of studs 156 but is less than the diameter of the heads 158 thereon. The chambers 172 in the clamping gears extend outwardly through the periphery of those gears at one position on the outer surface thereof to define an enlarged opening 178 (see Fig. 16). The opening 178 is sufficiently large to receive the heads 158 of studs 156. A suitable handle or actuator 180 is provided with depending arms or flanges 182 which may be rigidly affixed to the end faces of the cam gears. The handle or actuator 180 constitutes a lever arm extending generally radially of the gear and by which the gear may be rotated through a partial revolution. Referring to Fig. 13, it will be seen that raising the handle 180 to a position where it projects upwardly will rotate the cam gear connected thereto to such an extent that the enlarged opening 178 will be positioned at substantially the bottom of the gear and in such position that the stud 156 may be readily withdrawn therefrom.

On assembly of a structure including the modification of these figures, the handles 180 are raised to align openings 178 with openings 170 in the bottoms of housings 162 and the panels may then be moved to nested relationship and studs 156 projected into and through the openings 178. Upon moving the actuator handles 180 from their outward position to the position of Fig. 13 the cam surfaces 174 will engage the shoulders 160 of studs 156 and draw the edge portions of the panels tightly together and complete the sealing of the joint therebetween.

As clearly indicated in Fig. 13 additional gears extend between the spaced cam gears described and serve to transmit motion from the gear directly actuated by handle 180 to the other cam gears spaced therefrom along the joint. A single actuator 180 may serve to clamp a substantial length of joint together and in many instances will suffice for an entire joint between adjacent panels.

As is clear from Fig. 16 the slots 176 and openings 178 of the cam gears do not extend the full axial length of the gears but terminate short of the ends thereof. Thus gear teeth are provided around the entire periphery of the cam gears to maintain driving engagement with adjacent gears at all times regardless of the angular portion of the cam gears.

If desired, the housing 162 may be provided with a staple-like projection 184 (see Figs. 12 and 13) in position to extend through an opening 186 in handle 180 when the latter is in its lowered or closed position. A suitable hook or latch 188 may be pivoted to the handle 180 and moved to a position to extend through the projection 184 to lock the handle in its joint-clamping position. If desired stops 190 may be mounted on the handle 180 to prevent damage to the hook 188 by confining it to a position within the outline of handle 180. If desired the surface of the panel 150 may be recessed as at 192 to receive the handle 180 in flush relation to the outer surface of the panel.

While a limited number of specific embodiments have been shown and described it is to be understood that the invention is not limited thereto but is to encompass all modifications falling fairly within the scope of the appended claims.

I claim:

1. In a structure having wall panels and means forming a joint between adjacent edges thereof, said means comprising overlapping edge portions of said panels extending along said joint, a plurality of clamping means spaced along said joint for clamping said overlapping portions together, said clamping means comprising, internally threaded elements carried by one of said overlapping edge portions and mating externally threaded elements carried by the other of said overlapping edge portions, the threaded elements on the overlapping edge portion of one of said panels being rotatably mounted thereon, means interconnecting said rotatable elements for simultaneous rotation, automatically releasable means between said interconnecting means and each of said rotatable elements whereby said rotatable elements may be further rotated after one or more of said clamping means has been drawn tight, and a single rotatable actuator arranged to impart rotation to all of said rotatable elements whereby to substantially simultaneously tighten or release said spaced clamping means.

2. A structure as defined in claim 1 wherein said threaded elements and interconnecting means are enclosed by said overlapping edge portions and wherein said actuator is accessible from the exterior of said structure.

3. A structure as defined in claim 1 wherein said edge portion mounting said rotatable elements is provided with an internal chamber extending along said joint, said rotatable elements and interconnecting means being housed within said chamber.

4. A structure as defined in claim 1 wherein said interconnecting means comprises a train of gears, said rotatable elements each including a gear of said train drivingly connected thereto.

5. A structure as defined in claim 1 wherein said interconnecting means comprises a train of gears, said rotatable elements each including a gear of said train drivingly connected thereto, the connection between each of said rotatable elements and its associated gear including said automatically releasable means.

6. A structure as defined in claim 1 wherein said interconnecting means comprises a train of gears, and wherein each of said rotatable elements is arranged to be frictionally driven by a different gear of said train.

7. A structure as defined in claim 1 wherein said interconnecting means comprises a train of gears, each of said rotatable elements being connected to a different gear of said train by releasable positive drive means, and means for disconnecting said drive by movement of said rotatable element in one direction to a predetermined position relative to its mating threaded element.

8. A structure as defined in claim 1 wherein said interconnecting means comprises a train of gears, each of said rotatable elements being connected to a different gear of said train by a first releasable positive drive means, and means for disconnecting said drive by movement of said rotatable element in a joint tightening direction to a predetermined position relative to its mating threaded element, and ratchet means establishing a second positive drive to each of said rotatable elements from its associated gear in a joint releasing direction only.

9. In a structure comprising panels and means forming a joint between adjacent edges thereof, said means comprising overlapping integral edge portions on said panels, one of said edge portions being provided with an internal chamber extending along said joint, the other of said edge portions having spaced clamp elements fixed thereon, spaced movable means in said chamber engageable with said spaced clamp elements to apply clamping pressure to said joint, actuator means extending outwardly of said chamber and connected to all of said movable means to move them substantially simultaneously into and out of clamping engagement with said fixed clamp elements, said panels and overlapping edge portions being of molded resinous material and said chamber being defined by a tubular metal structure embedded in said one of said edge portions, said fixed clamp elements being studs fixed to a metal strip embedded in the said other of said edge portions, said studs projecting into the said chamber.

10. A structure as defined in claim 9 wherein said panels and overlapping edge portions are of molded resinous material and wherein said chamber is defined by a tubular metal structure imbedded in said one of said edge portions, said tubular metal structure being generally rectangular in section and having longitudinal grooves in opposed walls thereof, said means connected to all said movable means being a train of intermeshed gears, each gear of said train having axial trunnions extending into said longitudinal grooves.

(References on following page)

References Cited in the file of this patent

UNITED STATES PATENTS

| | | | |
|---|---|---|---|
| 508,426 | Klipstein | Nov. 14, | 1895 |
| 826,621 | Sticht | July 24, | 1906 |
| 957,931 | Bond | May 17, | 1910 |
| 1,276,312 | Ballenberg | Aug. 20, | 1918 |
| 1,403,144 | Brown | Jan. 10, | 1922 |
| 1,521,040 | Nicholson | Dec. 30, | 1924 |
| 1,742,141 | Hicks | Dec. 31, | 1929 |
| 1,797,713 | Brogelli | Mar. 24, | 1931 |
| 2,042,617 | Murphy et al. | June 2, | 1936 |
| 2,191,081 | Menken et al. | Feb. 20, | 1940 |
| 2,284,921 | Purkiss | June 2, | 1942 |
| 2,430,961 | Sprunger | Nov. 18, | 1947 |